United States Patent

[11] 3,571,751

[72] Inventor Harry Kratochvil
Fords, N.J.
[21] Appl. No. 743,550
[22] Filed July 9, 1968
[45] Patented Mar. 23, 1971
[73] Assignee Wagner Electric Corporation

[54] TRANSISTOR-REED SWITCH FLASHER
10 Claims, 4 Drawing Figs.

[52] U.S. Cl. .......... 331/111, 340/81
[51] Int. Cl. .......... H03k 3/26
[50] Field of Search .......... 331/111, 143; 340/81, 340; 335/151

[56] References Cited
UNITED STATES PATENTS
3,113,242 12/1963 Leeder .......... 331/111X
3,268,765 8/1966 Randolph .......... 340/340X
OTHER REFERENCES
Chapman, " Period of Sawtooth Ramp Extends to 5 Hours," ELECTRONICS, June 27, 1966

*Primary Examiner*—Roy Lake
*Assistant Examiner*—James B. Mullins
*Attorney*—Eyre, Mann and Lucas

ABSTRACT: Flashing of a lamp load is effected by a transistor, the emitter and collector of which are connected in series in the load current path. The bias on the base of the transistor is caused to fluctuate by a reed relay, the contacts of which are intermittently opened and closed upon charging and discharging of a capacitor connected in parallel with the reed relay coil.

INVENTOR
HARRY KRATOCHVIL
BY
Eyre, Mann & Lucas
ATTORNEYS

TRANSISTOR-REED SWITCH FLASHER

The present invention relates to a flasher circuit for high load current applications, particularly in automotive signalling circuits.

The invention disclosed herein comprises a load current-controlling transistor which is rendered alternately conductive and nonconductive in response to the state of a reed relay which controls the bias at the base of the transistor and which is alternately energized and deenergized by the discharging and charging of a capacitor. Accordingly, the load, e.g. automotive signal lamps, is alternately energized and deenergized directly by the change in state of the load current-controlling transistor. Since the flasher device of the invention does not utilize mechanical switching to flash the load, it is not subject to the deterioration of switching contacts encountered with prior art devices which use such mechanical switching. Furthermore, the transistor and reed relay used in the flasher of the invention are highly reliable components and, in combination, less costly than prior art all solid-state flasher devices. A further benefit is the fact that the transistor-reed relay combination used in the flasher of the invention is less sensitive to temperature differences and therefore not as prone to thermal drift or other adverse thermal effects encountered with prior art all solid-state devices.

A better understanding of the present invention may be had by referring to the several FIGS., of which:

Figure 1:
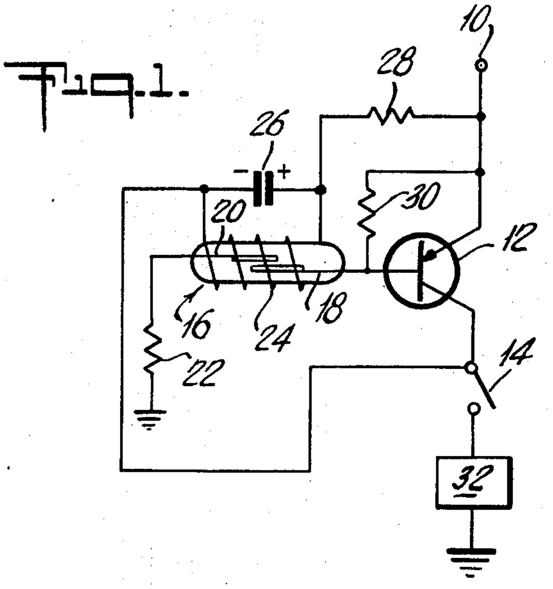
FIG. 1 is a schematic wiring diagram of a first preferred embodiment of the present invention.

Referring now specifically to FIG. 1, terminal 10 is the point of connection of the circuit to a source of DC power. The emitter of transistor 12 is connected to terminal 10, and the collector of transistor 12 is connected to the high side of switch 14. The base of transistor 12 is connected to reed relay 16 at reed 18, which when in contact with reed 20, connects the base of transistor 12 to ground through resistor 22. The coil 24 of reed relay 16 is connected in parallel with a capacitor 26. Resistor 28 is connected between terminal 10 and the high junction of capacitor 26 and coil 25, the low junction being connected to the collector of transistor 12. A small resistance 30 is optionally connected across the emitter-base junction of transistor 12 to prevent thermal runaway by shunting transistor leakage currents when the base is open-circuited. A load 32, e.g., one or more incandescent lamps, is connected to the low side of switch 14.

When terminal 10 is connected to a source of DC power and switch 14 is closed, transistor 12 is initially nonconductive since no current can flow across the emitter-base junction due to the deenergized state of reed relay 16. Charging current flows through resistor 28 to capacitor 26, which is connected to ground through the low resistance of the cold lamp load 32. When the voltage across the capacitor 26 increases to the point where the reed relay coil 24 draws sufficient current to close the reeds 18 and 20, the base of transistor 12 is connected through resistor 22 to ground. Current now flows across the emitter-base junction of transistor 12 and renders the transistor conductive. Load current will then flow across the emitter-collector junction of transistor 12 and through the closed switch 14 to the lamp load 32. Since the collector of conductive transistor 12 is essentially at line voltage, capacitor 26 will discharge through reed relay coil 24 and through resistor 28 and the emitter-collector junction of transistor 12. When the voltage across capacitor 26 decreases sufficiently, current will be reduced in coil 24 and the reeds 18 and 20 will open, thus cutting off the flow of current across the emitter-base junction of transistor 12, thereby rendering the transistor nonconductive. The lamp load 32 is simultaneously deenergized. This cycle repeats itself as long as switch 14 remains closed. In this embodiment, both the flashing rate and the ON and OFF times of the circuit are determined by the net resistance and the capacitance in the charging current path, by the relative impedances of the two discharge current paths, and by the energization and deenergization thresholds of the reed relay.

Figure 2:
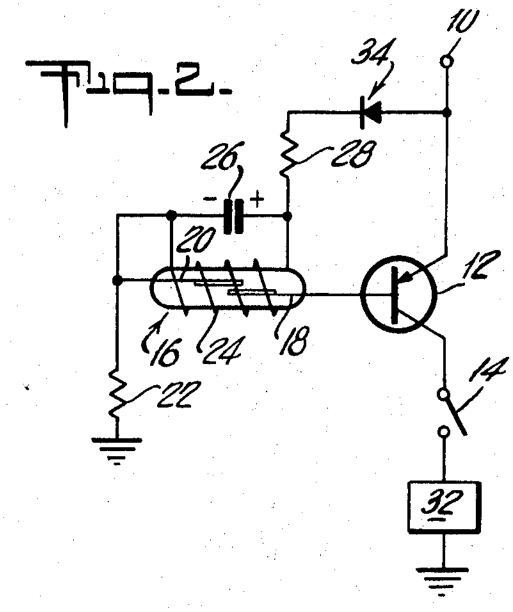
FIG. 2 is a schematic wiring diagram of a second preferred embodiment of the present invention.

Referring now specifically to FIG. 2, which is a modified version of the circuit shown in FIG. 1, it will be seen that a diode 34 has been connected in series between resistor 28 and terminal 10, with its anode connected to terminal 10. In addition, the low junction of capacitor 26 and coil 24 is now connected to the junction of reed 20 and resistor 22, rather than to the high side of switch 14 as in FIG. 1. Optional resistor 30 has been eliminated. Otherwise, this circuit is the same as that shown in FIG. 1.

When terminal 10 is connected to a source of DC power the operation cycle of this circuit will be essentially the same as that of the circuit shown in FIG. 1. However, capacitor 26 cannot partially discharge through resistor 28 and the emitter-base junction of transistor 12 because of the interposition of diode 34 in this current path. Thus, the discharge time of capacitor 26 is lengthened and the ON period of the lamp load is increased. In this embodiment, both the flashing rate and the ON and OFF time of the circuit are determined by the net resistance and the capacitance in the charging current path, by the impedance of the discharge current path, and by the energization and deenergization thresholds of the reed relay.

Figure 3:
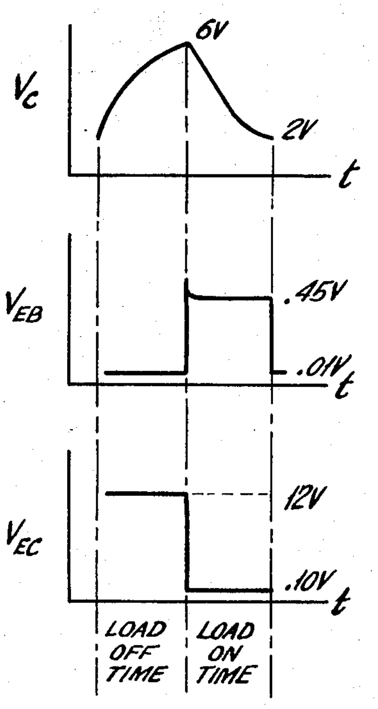
FIG. 3 is an illustration of the voltage waveforms at specific points in the circuit during a single flashing cycle.

The graphs of FIG. 3 illustrate, from top to bottom, the voltage waves formed across the capacitor 26, across the emitter-base junction of transistor 12, and across the emitter-collector junction of transistor 12 during one full flashing cycle of the circuits shown in FIG. 1 and FIG. 2. The voltage across the capacitor 26 is seen to have an exponential rise during that portion of the cycle in which the lamp load is deenergized. When the coil 24 in FIG. 1 begins to draw sufficient current to close the reed contacts, discharge of capacitor 26 commences almost instantaneously, resulting in an exponential decrease in the voltage across its terminals.

During the period of deenergization of the lamp load, the voltage across the emitter-base junction of transistor 12 is very low, on the order of 0.01 volts DC, and is attributable to the IR drop across resistor 30 caused by leakage current flow through resistor 30, across the base-collector junction of transistor 12, and through switch 14 and load 32 to ground. During the period of energization of the lamp load, current will flow from terminal 10 through the parallel combination of the emitter-base junction of transistor 12 and resistor 30, through reeds 18 and 20, and through resistor 22 to the ground, thereby causing a substantial increase in the current flow through resistor 30 and the emitter-base junction of transistor 12, thereby producing an emitter-base voltage of approximately 0.45 volts DC.

During the period of deenergization of the lamp load, the voltage across the emitter-collector junction of transistor 12 will be substantially the value of the line voltage, e.g., approximately 12 volts DC in an automotive signal system. During the period of energization of the lamp load, the transistor 12 is conductive and the voltage drop across the emitter-collector junction will drop to approximately 0.10 volts DC.

Figure 4:
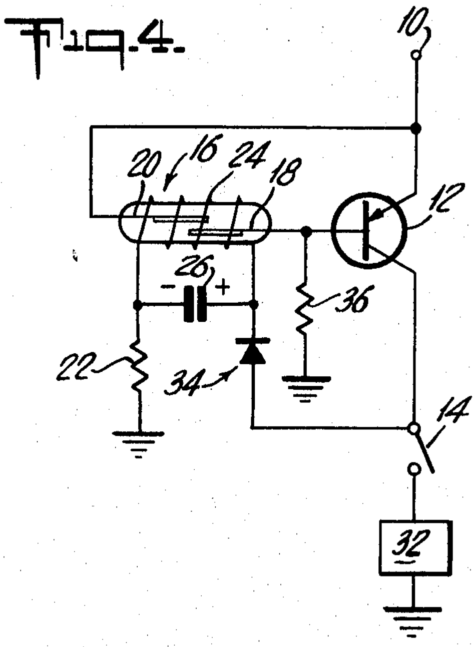
FIG. 4 is a schematic wiring diagram of a third preferred embodiment of the present invention.

Referring now specifically to FIG. 4, a third variation of the circuit shown in FIG. 1 is schematically shown. In this embodiment, a direct connection from terminal 10 is made to reed 20 of reed relay 16, and the resistor 28 of FIG. 1 is eliminated. A diode 34 is connected in series in the charging current path as in FIG. 3, but in the present embodiment its anode is connected to the collector of transistor 12 and its cathode is connected to the high junction of capacitor 26 and coil 24, the low junction of which is connected through resistor 22 to ground as in FIG. 3. The resistor 30 which connected the emitter and base of transistor 12 in FIG. 1 is eliminated. A resistor 36 is connected from the base of transistor 12 to ground. Otherwise, this circuit is the same as that shown in FIG. 1.

When terminal 10 is connected to a source of DC power and switch 14 is closed, transistor 12 is rendered conductive immediately, since current of sufficient magnitude is flowing across the emitter-base junction and through resistor 36 to ground. Load 32 is thus energized substantially simultaneously with the closing of switch 14. Current now flows through diode 34 to charge capacitor 26. When the voltage across capacitor 26 reaches a predetermined level, the current through coil 24 will increase to the level necessary to bring reeds 18 and 20 into contact. Thus, the emitter-base junction of transistor 12 is shunted and current no longer flows across that junction. Consequently, transistor 12 becomes nonconductive. Charging current no longer flows through diode 34 and capacitor 26 will discharge through coil 24, thus holding reeds 18 and 20 closed until the discharge current falls below the deenergization threshold of the relay. Diode 34 prevents any portion of the discharge current of capacitor 26 from flowing to ground through switch 14 and lamp load 32, thus prolonging the OFF time of the load 32. This cycle repeats itself as long as switch 14 remains closed. In this embodiment, both the flashing rate and the load ON and OFF time are determined by the net resistance and the capacitance in the charging current path, by the impedance of the discharge current path, and by the energization and deenergization thresholds of the reed relay.

The advantages of the present invention will be apparent to those skilled in the art, as well as changes which could be made in the foregoing embodiments without departing from the spirit and scope of the invention. Therefore, it should be understood that the present invention is not to be limited to the foregoing description of the specific embodiments thereof, but is to be determined by the spirit and scope of the accompanying claims.

I claim:

1. A 3-terminal flasher circuit comprising:
1. solid-state switching means having an input terminal and first and second output terminals;
2. signal circuit means connected to said input terminal of said solid-state switching means, said signal circuit means comprising reed relay means having a coil and first and second reeds; and
3. timing circuit means including a capacitance connected in parallel with said coil of said reed relay means, wherein when said first and second output terminals of said solid-state switching means are connected in series with a source of direct current power and a load which is to be intermittently energized, and said signal circuit means is connected to the neutral terminal of said source of direct current power, said timing circuit means is operative alternately to energize and deenergize the coil of said reed relay means of said signal circuit means, which is responsively operative to provide a fluctuating signal to said input terminal of said solid-state switching means, which is responsively operative to permit an intermittent direct current to flow through the load.

2. The flasher circuit according to claim 1 wherein said solid-state switching device is a transistor having emitter, base and collector electrodes corresponding to said first output terminal, said input terminal, and said second output terminal, respectively.

3. The flasher circuit according to claim 1 wherein said signal circuit means includes a first resistance connected at one terminal to the first reed of said reed relay means, the other terminal of said first resistance connecting said signal circuit means to said neutral terminal, and wherein said second reed of said reed relay means is connected to said input terminal of said solid-state switching means.

4. The flasher circuit according to claim 3, further comprising a second resistance connected between said first output terminal and said input terminal of said solid-state switching means.

5. The flasher circuit according to claim 1 wherein said signal circuit means comprises a third resistance having one terminal connected to said input terminal of said solid-state switching device, the other terminal connecting said signal circuit means to said neutral terminal, and the first and second reeds of said reed relay means are connected to said first output terminal and said input terminal, respectively, of said solid-state switching means.

6. The flasher circuit according to claim 1 wherein said timing circuit means comprises a charging current path including a fourth resistance connected in series with said capacitance connected in parallel with the coil of said reed relay means.

7. The flasher circuit according to claim 6 wherein said charging current path further includes current rectification means connected in series with said fourth resistance and said capacitance, and oriented to confine discharge current from said capacitance to a path through the coil of said reed relay means.

8. The flasher circuit according to claim 6 wherein said charging current path is connected between said first and second output terminals of said solid-state switching means.

9. The flasher circuit according to claim 6 wherein said charging current path includes in series a first resistance having one terminal connecting said timing circuit means and said signal circuit means to said neutral terminal.

10. The flasher circuit according to claim 6 wherein said charging current path is connected at its origin to said second output terminal of said solid-state switching means and is terminated at said neutral terminal.